United States Patent
Ke

(10) Patent No.: US 10,606,088 B1
(45) Date of Patent: Mar. 31, 2020

(54) DUAL FUNCTION KALEIDOSCOPE

(71) Applicant: En Ke, West Covina, CA (US)

(72) Inventor: En Ke, West Covina, CA (US)

( * ) Notice: Subject to any disclaimer, the term of this patent is extended or adjusted under 35 U.S.C. 154(b) by 0 days.

(21) Appl. No.: 16/404,554

(22) Filed: May 6, 2019

(51) Int. Cl.
| | |
|---|---|
| G02B 27/08 | (2006.01) |
| A45D 40/18 | (2006.01) |
| A63H 33/22 | (2006.01) |
| A63J 15/00 | (2006.01) |
| A47F 5/025 | (2006.01) |
| A63F 7/38 | (2006.01) |

(52) U.S. Cl.
CPC ............. *G02B 27/08* (2013.01); *A45D 40/18* (2013.01); *A47F 5/025* (2013.01); *A63F 7/38* (2013.01); *A63H 33/22* (2013.01); *A63J 15/00* (2013.01)

(58) Field of Classification Search
CPC ......... G02B 27/08; A63H 33/22; A47F 5/025; A63F 7/38; A63J 15/00
USPC ................................................. 359/616, 617
See application file for complete search history.

(56) References Cited

U.S. PATENT DOCUMENTS

| | | | | | |
|---|---|---|---|---|---|
| 1,485,795 | A | * | 3/1924 | Mallernee | G02B 27/08 |
| | | | | | 359/617 |
| 2,991,689 | A | * | 7/1961 | Taylor | G02B 27/08 |
| | | | | | 359/617 |
| 3,066,571 | A | * | 12/1962 | Shaffer | A63J 15/00 |
| | | | | | 359/616 |
| 3,160,056 | A | * | 12/1964 | Taylor | G02B 27/08 |
| | | | | | 359/616 |
| 3,748,013 | A | * | 7/1973 | Orans | G02B 27/08 |
| | | | | | 359/617 |
| 3,923,368 | A | * | 12/1975 | Hassel | G02B 27/08 |
| | | | | | 359/616 |
| 4,158,982 | A | * | 6/1979 | Chusid | A63J 17/00 |
| | | | | | 353/2 |
| 4,439,002 | A | * | 3/1984 | Brown | G02B 27/08 |
| | | | | | 359/616 |
| 4,494,820 | A | * | 1/1985 | Klawitter | G02B 27/08 |
| | | | | | 359/616 |
| 4,732,439 | A | * | 3/1988 | Chioffe | G02B 27/08 |
| | | | | | 359/616 |
| 4,740,046 | A | * | 4/1988 | MacCarthy | G02B 27/08 |
| | | | | | 359/617 |

(Continued)

FOREIGN PATENT DOCUMENTS

| | | | | |
|---|---|---|---|---|
| JP | 2012201370 | * | 10/2012 | ............ B65D 5/50 |

*Primary Examiner* — Clayton E. LaBalle
*Assistant Examiner* — Kevin C Butler
(74) *Attorney, Agent, or Firm* — Fish IP Law, LLP

(57) ABSTRACT

A kaleidoscope has an inside scaffold that allows the kaleidoscope to be used as both a toy and packaging for merchandise. The kaleidoscope preferably has a body with a chamber at one end that includes freely movable ornaments. A cap having an eyehole is configured to matingly close the body. Inside the body, three or more reflective surfaces are positioned at an angle to each other to form a polygon. The scaffold is disposed in the body, surrounded by the reflective surfaces, and has a cross-sectional shape sized and dimensioned to prevent the scaffold from moving or rotating relative to the reflective surfaces. Preferably, the scaffold has a polygonal cross-sectional shape substantially similar to the polygon formed by the reflective surfaces. A product (e.g., a lipstick) can be stored inside the scaffold without being able to move freely inside the kaleidoscope.

17 Claims, 7 Drawing Sheets

(56) References Cited

U.S. PATENT DOCUMENTS

| | | | | |
|---|---|---|---|---|
| 4,762,380 A * | 8/1988 | MacCarthy | ............ | G02B 27/08 359/616 |
| 4,793,671 A * | 12/1988 | Palochak | ................ | G02B 27/08 359/616 |
| 5,131,734 A * | 7/1992 | Hausner | ................. | A63H 33/22 359/617 |
| 5,132,844 A * | 7/1992 | Sharp, Jr. | ............... | G02B 27/08 359/617 |
| 5,172,270 A * | 12/1992 | Peiperl | ................... | A63H 33/22 359/617 |
| 5,229,884 A * | 7/1993 | Kelderhouse | .......... | G02B 27/08 359/616 |
| 5,786,938 A * | 7/1998 | Chang | ................... | G02B 27/08 359/617 |
| 6,422,705 B1 * | 7/2002 | Leary | ..................... | G02B 27/08 353/1 |
| 2002/0109921 A1 * | 8/2002 | Liu | ........................ | G02B 27/08 359/616 |
| 2003/0076597 A1 * | 4/2003 | Chang | .................... | G02B 27/08 359/617 |
| 2003/0169501 A1 * | 9/2003 | Nelson | .................. | G02B 27/08 359/616 |
| 2004/0032662 A1 * | 2/2004 | Hattori | .................. | G02B 27/08 359/616 |
| 2004/0246585 A1 * | 12/2004 | Mizoguchi | ............ | G02B 27/08 359/617 |
| 2007/0223099 A1 * | 9/2007 | Bailey | ..................... | A63H 33/22 359/616 |
| 2011/0228388 A1 * | 9/2011 | Kory | ...................... | G02B 27/08 359/471 |
| 2011/0261452 A1 * | 10/2011 | Kory | ...................... | G02B 27/08 359/471 |
| 2011/0303571 A1 * | 12/2011 | Loce | ...................... | B65D 5/425 206/457 |
| 2012/0077152 A1 * | 3/2012 | Saha | ...................... | G09B 11/00 434/81 |
| 2016/0048040 A1 * | 2/2016 | Saha | ...................... | G02F 1/0131 359/291 |

* cited by examiner

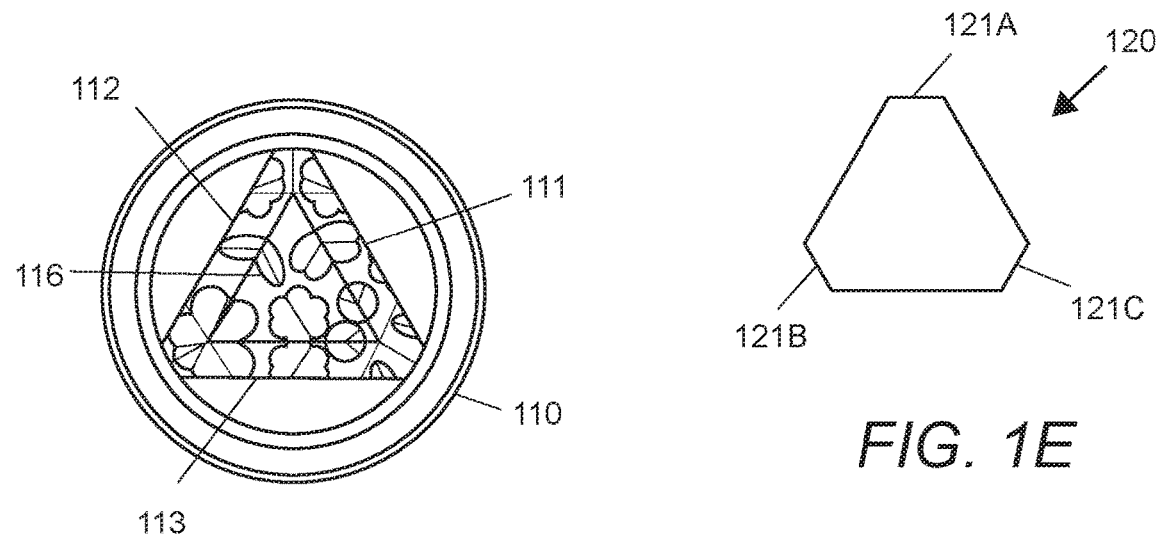
FIG. 1D
FIG. 1E
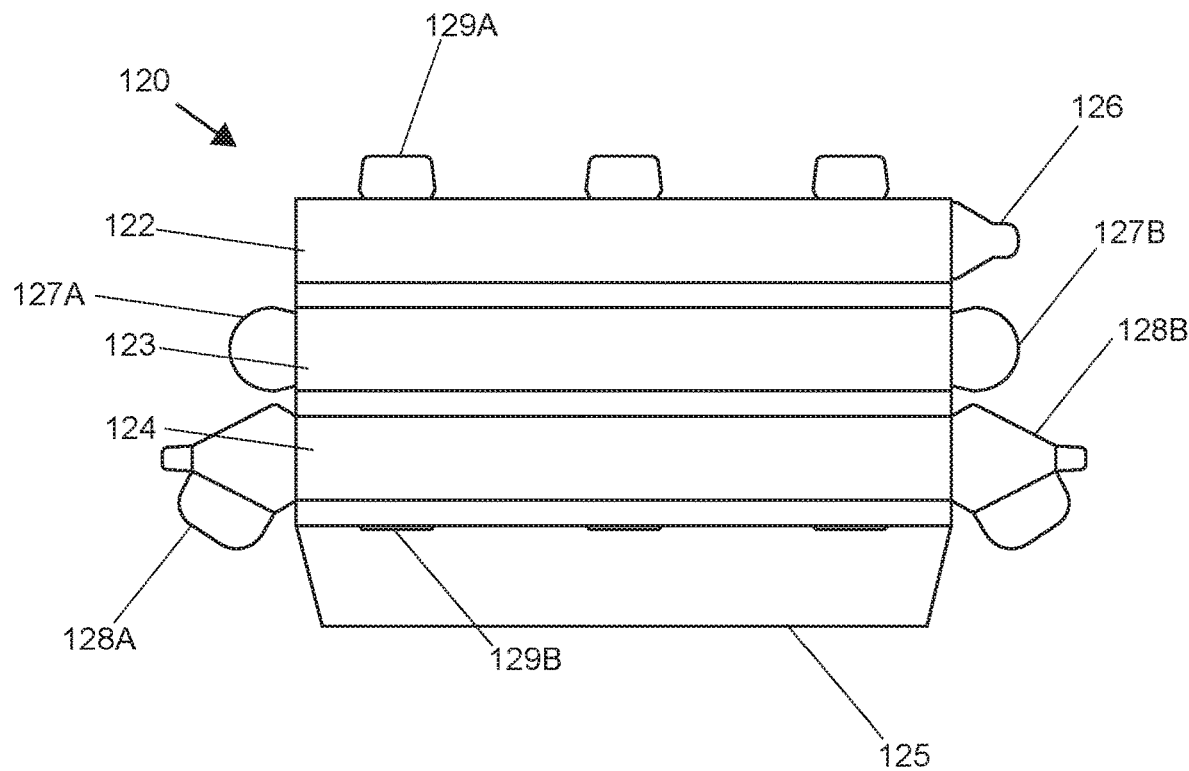
FIG. 1F

DUAL FUNCTION KALEIDOSCOPE

FIELD OF THE INVENTION

The field of the invention is product packaging.

BACKGROUND

The following description includes information that may be useful in understanding the present invention. It is not an admission that any of the information provided herein is prior art or relevant to the presently claimed invention, or that any publication specifically or implicitly referenced is prior art.

Despite the old saying "don't judge a book by its cover," packaging is essential to a product. For example, Kleenex™ paper tissues are packaged in box that not only holds the tissues, keeping them clean, but also functions as a tissue dispenser. In contrast, traditional paper towels and toilet paper rolls are exposed to collect dust, and one would need an additional dispenser to hold them. Clearly, packaging is not just about holding the product. It is about meeting the needs of the consumer.

Different consumers, for example, members of a family shopping together, often have different needs. A mother might have a need for cosmetic products (e.g., lipstick). But her child might want to play with toys. It would enhance both the mother and child's shopping experience if a given product can meet both their needs, by combing a toy and a cosmetic product.

A kaleidoscope is a popular toy for kids. Interestingly, a kaleidoscope can display an infinite number of symmetrical patterns formed by the reflections of colorful ornamental objects. However, it would be counterintuitive to use a kaleidoscope as packaging, since a product inside the kaleidoscope would prevent one from seeing the reflections of the ornamental objects. Moreover, a small cosmetic product inside a relatively large kaleidoscope would move freely inside the kaleidoscope, making unpleasant sounds, and possibly get damaged easily.

Thus, there is still a need for a dual function kaleidoscope that can be used as toy and for packaging merchandise safely.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods in which a kaleidoscope having an inside scaffold can be used as both a toy and packaging for a merchandise.

The contemplated kaleidoscope has a body with a chamber at one end that includes freely movable ornamental objects with different colors. In preferred embodiments, the body is cylindrical, although other shapes are contemplated (e.g., square, triangular, etc.). The body is preferably non-transparent, and printed with graphic and information about the merchandise inside the kaleidoscope. A cap having an eyehole is configured to matingly close the body. One can peak through the eyehole to see the reflections of the ornamental objects on the reflective surfaces.

Inside the body, three or more reflective surfaces are positioned at an angle to each other. In preferred embodiments, the reflective surfaces form a polygon, for example, a triangle, a square, a pentagon, a hexagon, and so forth. The reflective surfaces can be made of glass, mirror, plastic, or some other surfaces that can reflect light. The body has an annular flange that keeps the reflective surfaces from exiting the body.

A scaffold is disposed in the body, surrounded by the reflective surfaces, and has a cross-sectional shape sized and dimensioned to prevent the scaffold from rotating relative to the reflective surfaces. Preferably, the scaffold has a cross-sectional shape having angles that would prevent the scaffold from rotating relative to the reflective surfaces. For example, if the reflective surfaces form a polygon (e.g., a triangle), then the scaffold also has the same polygonal (i.e., triangular) cross section. However, it is also contemplated that the cross-sectional shape of the scaffold can be different than the cross section of the reflective surfaces while still preventing rotation. For example, the scaffold can have a cylindrical middle section and polygonal end sections that prevent rotation. Another example would be that the scaffold has a cylindrical shape large enough that touches at least two reflective surfaces, and the friction between the scaffold and the reflective surfaces would prevent the scaffold from moving freely.

The scaffold can be made of any suitable material (e.g., paper, plastic, cardboard, etc.) or any combination of materials (e.g., cardboard combined with polymeric foam), but preferably a thermal insulation material. In preferred embodiments, the scaffold has a handle that can be used to conveniently pull the scaffold out of the kaleidoscope. A preferred scaffold also has one or more cushions that can be used to dampen a force of impact. The cushions can be made from the same material as the rest of the scaffold or can be a softer material (e.g., a polymeric foam, etc.).

The inventive subject matter also provides a method of packaging a product, by placing a product inside the scaffold in the kaleidoscope. The scaffold advantageously holds and protects the product from freely moving inside the kaleidoscope. The scaffold and the air space between the scaffold and the body provide insulation from the outside, so that the product inside does not heat up quickly. Contemplated products include a cosmetic product (e.g., a lipstick, a mascara brush, an eye liner, etc.), food items, pens, or other types of product.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1D is a top plan view of the dual function kaleidoscope of FIG. 1A showing the inside of the body with the scaffold and lipstick removed therefrom.

FIG. 1E is a top plan view of the scaffold in FIG. 1A.

FIG. 1F is a top plan view of the scaffold in FIG. 1A shown in an unfolded configuration.

DETAILED DESCRIPTION

Figure 1A:
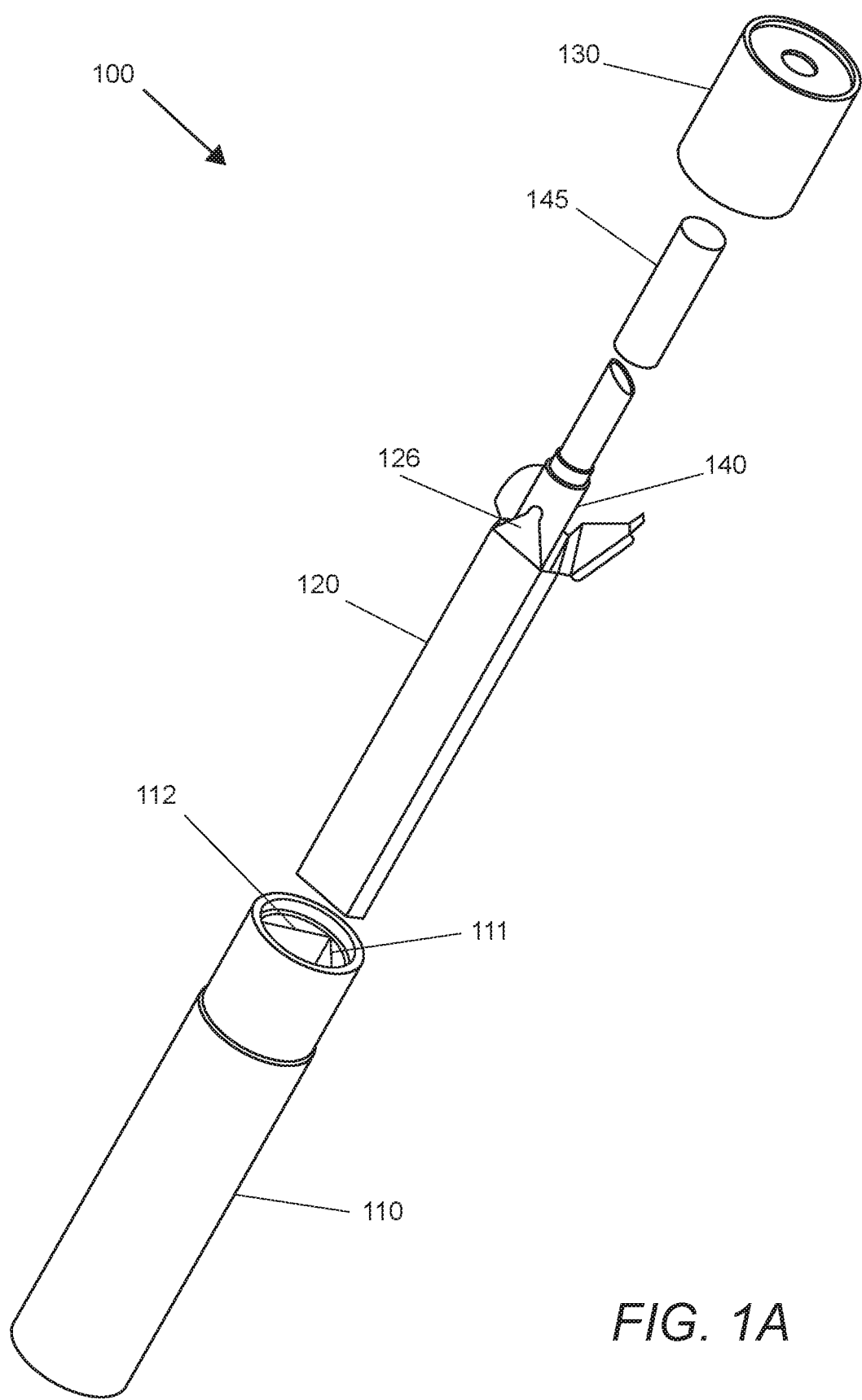
FIG. 1A is a perspective, partially exploded view of a preferred embodiment of a dual function kaleidoscope containing a lipstick.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As use herein, the term "similar" means two shapes having corresponding sides proportional and corresponding angles equal. Moreover, if minor changes are made to one or both shapes, they are considered substantially similar to each other. For example, a larger triangle with three equal sides is similar to a smaller triangle with three equal sides. If the smaller triangle has one or more corners beveled, it is substantially similar to the larger triangle. The terms "chamfer" and "bevel" are used interchangeably herein to mean cutting away an edge or corner.

Figures 1B, 1C:
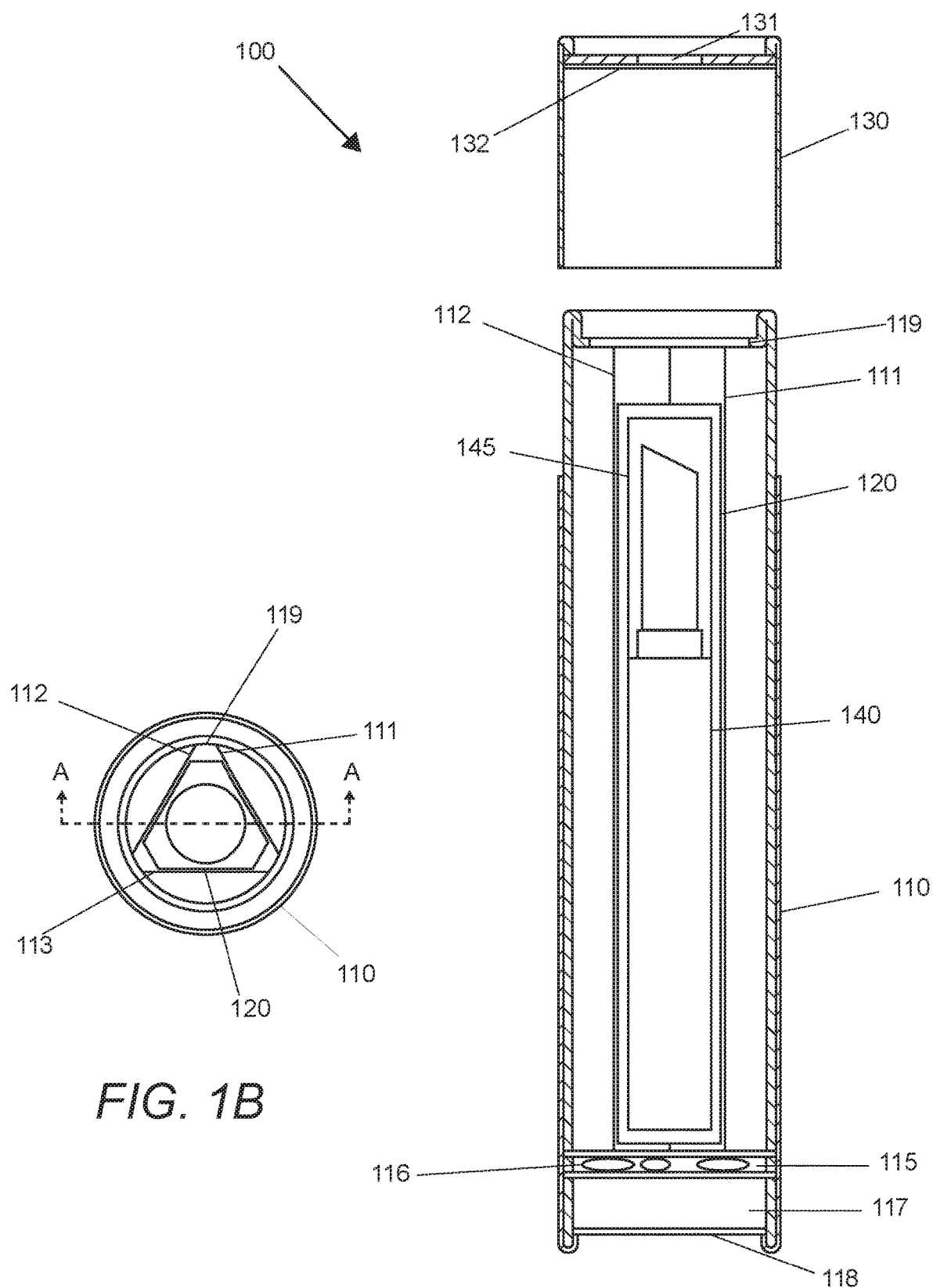
FIG. 1B is a top plan view of the body of the dual function kaleidoscope of FIG. 1A with the cap removed, showing the reflective surfaces, the scaffold, and a lipstick contained therein.
FIG. 1C is a cross-sectional partially exploded view of the body of the dual function kaleidoscope in FIG. 1B, along plane A-A, and the cap.

FIG. 1A and FIG. 1C show a preferred embodiment of a dual function kaleidoscope 100 containing a lipstick 140. The dual function kaleidoscope 100 has a body 110, a scaffold 120, and a cap 130 with an eyehole 131 covered by a transparent layer 132. The body 110 has a first chamber 115 that includes freely movable ornamental objects 116. The body 110 has a second chamber 117 next to the first chamber 115. The second chamber 117 has a bottom 118. The division between the first chamber 115 and the second chamber 117 is transparent or semi-transparent, and the bottom 118 is also transparent or semi-transparent, so that light can travel through. Inside the body 110, three reflective surfaces (111, 112, and 113) are positioned at 60° angle with respect to each other, forming a triangle. The body 110 has an annular flange 119 that prevents the reflective surfaces (111, 112, and 113) from exiting the body 110. A lipstick 140 having a cap 145 can be packaged inside the scaffold 120.

FIG. 1B shows scaffold 120 disposed inside the triangle formed by the reflective surfaces (111, 112, and 113). The scaffold 120 has a triangular cross-sectional shape with beveled edges 121A, 121B and 121C, shown in FIG. 1E. The substantially triangular shape prevents the scaffold 120 from rotating relative to the reflective surfaces (111, 112, and 113). The beveled edges 121A-C would avoid colliding with the annular flange 119 when inserting the scaffold 120 inside the body 110. As shown in FIG. 1D, one can see the reflections of the ornamental objects (e.g., 116) on the reflective surfaces (111, 112, and 113) when the scaffold 120 is removed from the body 110. A similar view can be seen through the eyehole 131 when the cap 130 is on.

Figure 1G:
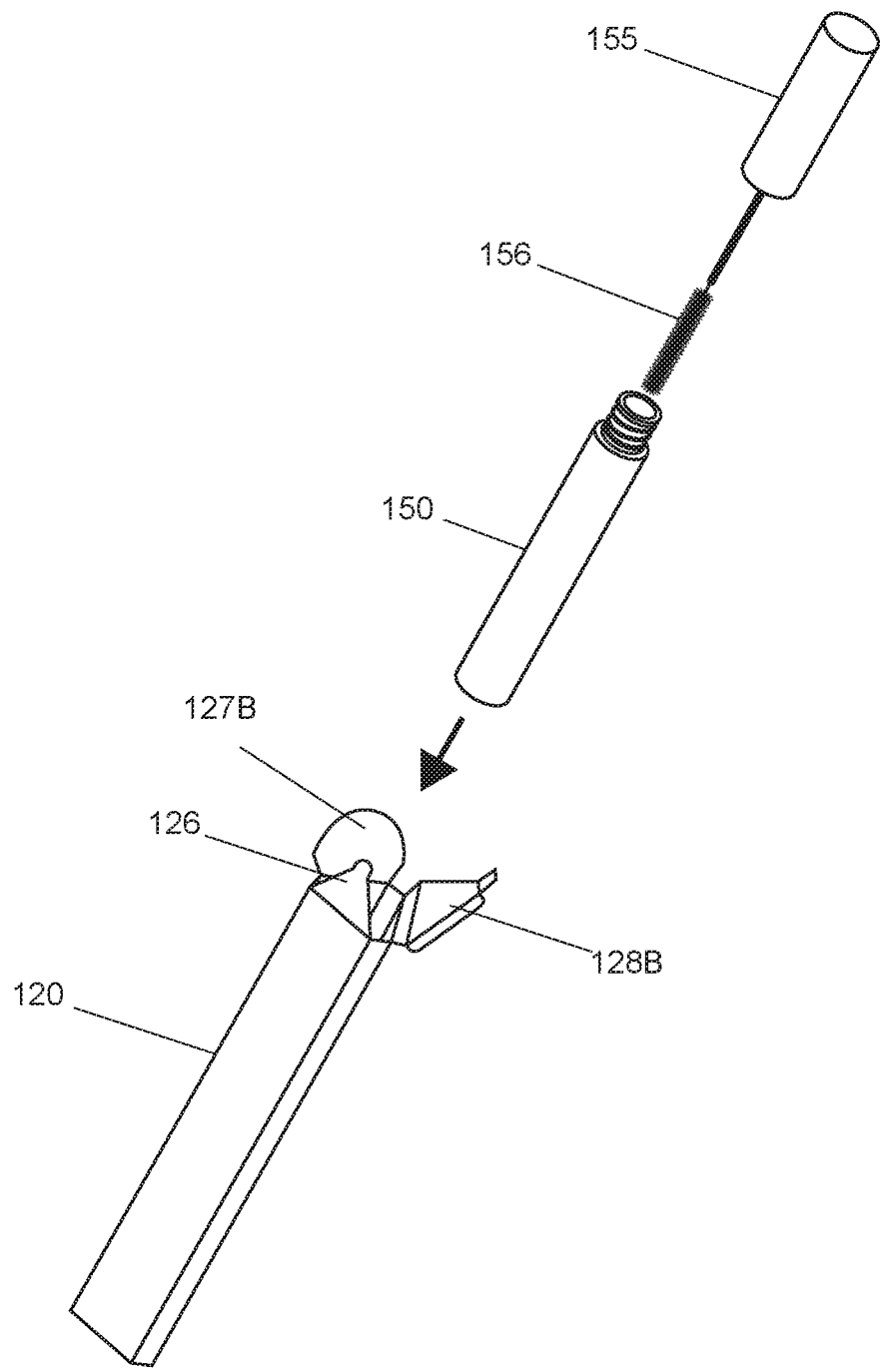
FIG. 1G is a perspective, exploded view of the scaffold in FIG. 1A containing a mascara set.
Figure 1H:
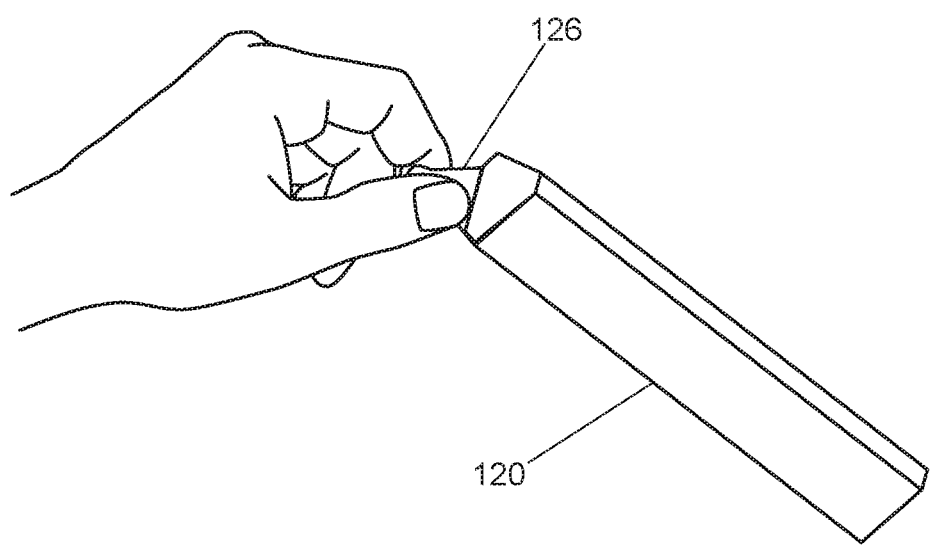
FIG. 1H is a perspective view of the scaffold in FIG. 1A in a folded configuration, having a handle held by a hand.

FIG. 1F shows the scaffold 120 in an unfolded configuration. The unfolded scaffold 120 has three side pieces 122-124 and a trapezoidal piece 125. Side piece 122 has a handle 126 that sticks out of the scaffold 120 when the scaffold 120 is folded (shown in FIG. 1H). The handle 126 can be used to conveniently pull the scaffold 120 out of the kaleidoscope 100. Side piece 123 has two cushions 127A and 127B that when folded are positioned at both ends of the scaffold 120, and cushions the product inside the scaffold 120 when the kaleidoscope 100 is in a standing position. Side piece 124 has two sealing pieces 128A and 128B that closes the folded scaffold 120 at both ends. Side piece 122 has three blades (e.g., 129A) that can be inserted into the three slits (e.g., 129B) next to the trapezoidal piece 125 to structurally secure the folded scaffold 120. The scaffold 120 can also hold a mascara set shown in FIG. 1G, including a container 150, a mascara brush 156, and a handle 155.

Figure 2A:
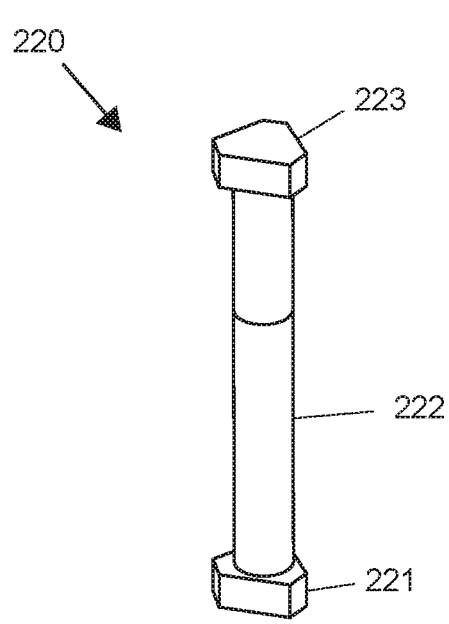
FIG. 2A is a perspective view of another embodiment of a scaffold.
Figure 2B:
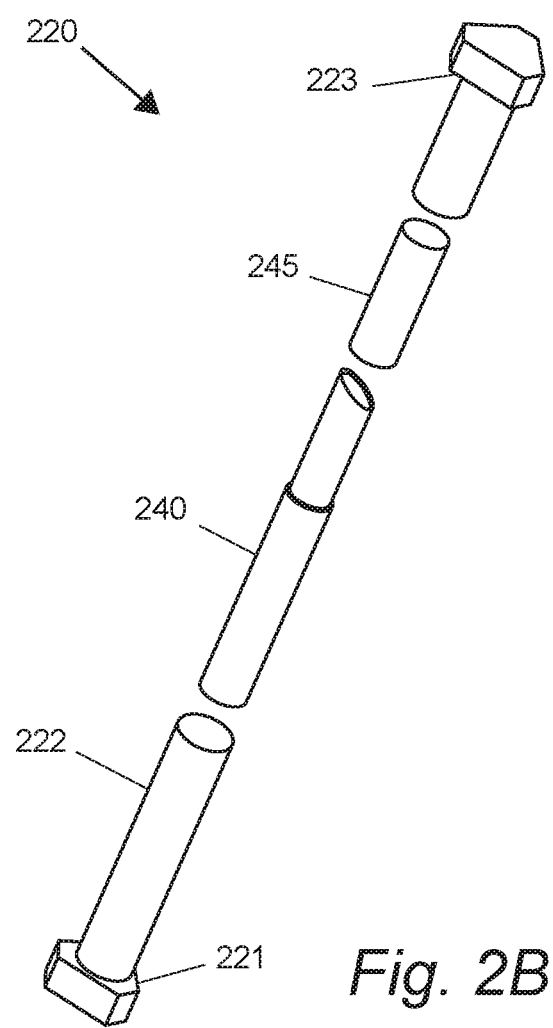
FIG. 2B is an exploded view of the scaffold in FIG. 2A containing a lipstick.

FIG. 2A shows another embodiment of a scaffold 220 having a cylindrical midsection 222 and triangular sections (221 and 223) at either end of the scaffold 220. The triangular sections (221 and 223) prevent the scaffold 220 from rotating relative to the reflective surfaces (111, 112, and 113) when the scaffold 220 is inside the body 110. FIG. 2B shows the scaffold 220 holding a lipstick 240.

Figure 3:
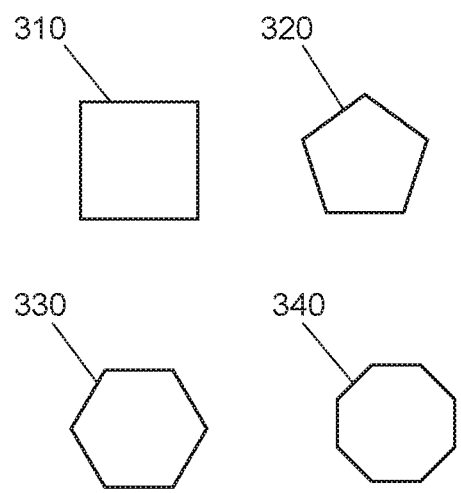
FIG. 3 shows cross-sectional views of other embodiments of scaffolds.

FIG. 3 shows other embodiments of reflective surfaces forming a cross section of a square 310, a pentagon 320, or an octagon 230. It is contemplated that the cross sections of the scaffolds should correspond to the shapes formed by the reflective surfaces. For example, if inside the body of the kaleidoscope there are four reflective surfaces forming a square, then the corresponding scaffold should have a square cross-section, preferably with beveled edges.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A lipstick inside a dual function kaleidoscope, comprising:
    a non-transparent body having at one end a first chamber that includes freely movable ornamental objects;
    a cap having an eyehole, and configured to mate with the body;
    at least three reflective surfaces positioned at an angle to each other, inside the body;
    a scaffold disposed within a cavity of the body, and having a cross-sectional shape sized and dimensioned to prevent the scaffold from rotating relative to the reflective surfaces; and
    a lipstick disposed within the scaffold.

2. The dual function kaleidoscope in claim 1, wherein the body has an annular flange sized and dimensioned to prevent the reflective surfaces from exiting the body.

3. The dual function kaleidoscope in claim 1, wherein the scaffold comprises a temperature insulating material.

4. The dual function kaleidoscope in claim 1, wherein the reflective surfaces form a polygon.

5. The dual function kaleidoscope in claim 4, wherein the polygon is a triangle.

6. The dual function kaleidoscope in claim 5, wherein the scaffold comprises a triangle cross section with beveled edges.

7. The dual function kaleidoscope in claim 4, wherein the polygon is a square.

8. The dual function kaleidoscope in claim 4, wherein the polygon is a pentagon.

9. The dual function kaleidoscope in claim 1, wherein the scaffold comprises a handle that can be used to pull the scaffold out of the kaleidoscope.

10. A dual function kaleidoscope, comprising:
    a non-transparent body having at one end a first chamber that includes freely movable ornamental objects;
    a cap having an eyehole, and configured to made with the body;
    at least three reflective surfaces positioned at an angle to each other, inside the body;
    a scaffold disposed within a cavity of the body, and having a cross-sectional shape sized and dimensioned to prevent the scaffold from rotating relative to the reflective surfaces; and
    a cosmetic product disposed within the scaffold.

11. The dual function kaleidoscope in claim 10, wherein the cosmetic product comprises a mascara.

12. The dual function kaleidoscope in claim 10, wherein the scaffold comprises a temperature insulating material.

13. The dual function kaleidoscope in claim 10, wherein the scaffold comprises a triangle cross section with beveled edges.

14. The dual function kaleidoscope in claim 10, wherein the scaffold comprises a handle that can be used to pull the scaffold out of the body.

15. A dual function kaleidoscope with a product, comprising:
    a non-transparent body having at one end a first chamber that includes freely movable ornamental objects;
    a cap having an eyehole, and configured to mate with the body;
    at least three reflective surfaces positioned at an angle to each other, inside the body; and
    a cosmetic product disposed within the body.

16. The dual function kaleidoscope in claim 15, wherein the cosmetic product comprises a lipstick.

17. The dual function kaleidoscope in claim 15, wherein the cosmetic product comprises a mascara.

* * * * *

UNITED STATES PATENT AND TRADEMARK OFFICE
CERTIFICATE OF CORRECTION

PATENT NO.        : 10,606,088 B1
APPLICATION NO.   : 16/404554
DATED             : March 31, 2020
INVENTOR(S)       : En Ke Page 1 of 1

It is certified that error appears in the above-identified patent and that said Letters Patent is hereby corrected as shown below:

In the Claims

At Column 6, Lines 28 and 29, Claim 10 change "and configured to made with the body;" to --and configured to mate with the body;--

Signed and Sealed this
Fourteenth Day of July, 2020

Andrei Iancu
*Director of the United States Patent and Trademark Office*